United States Patent
Peirce

(10) Patent No.: US 10,054,249 B2
(45) Date of Patent: Aug. 21, 2018

(54) UNIVERSAL TUBE FITTING ADAPTABLE FOR DIFFERENT SIZED TUBES

(71) Applicant: AGS COMPANY AUTOMOTIVE SOLUTIONS LLC, Pittsburgh, PA (US)

(72) Inventor: John M. Peirce, Portage, MI (US)

(73) Assignee: AGS COMPANY AUTOMOTIVE SOLUTIONS LLC, Pittsburgh, PA (US)

( * ) Notice: Subject to any disclaimer, the term of this patent is extended or adjusted under 35 U.S.C. 154(b) by 477 days.

(21) Appl. No.: 14/807,012

(22) Filed: Jul. 23, 2015

(65) Prior Publication Data

US 2016/0025248 A1 Jan. 28, 2016

Related U.S. Application Data

(60) Provisional application No. 62/028,498, filed on Jul. 24, 2014.

(51) Int. Cl.
*F16L 15/04* (2006.01)
*F16L 15/08* (2006.01)
(Continued)

(52) U.S. Cl.
CPC ......... *F16L 15/04* (2013.01); *F02M 37/0017* (2013.01); *F16L 15/08* (2013.01);
(Continued)

(58) Field of Classification Search
CPC ... F02M 37/0017; F16L 25/14; F16L 19/0286
(Continued)

(56) References Cited

U.S. PATENT DOCUMENTS

| 1,930,833 A | * | 10/1933 | Barrett | F16L 27/082 |
|---|---|---|---|---|
| | | | | 285/353 |
| 1,985,012 A | * | 12/1934 | Boehm | F16L 27/093 |
| | | | | 285/354 |

(Continued)

FOREIGN PATENT DOCUMENTS

WO WO199100469 1/1991

OTHER PUBLICATIONS

Hydraulics & Pneumatics, "Hydraulic Fittings and Flanges", A Staff Report, Jan. 1, 2012.

(Continued)

*Primary Examiner* — David Bochna
(74) *Attorney, Agent, or Firm* — Honigman Miller Schwartz and Cohn, LLP

(57) ABSTRACT

A fitting for connecting to a tube includes a connector body, a cartridge, a retaining ring and a fastener. The connector body has a generally cylindrical cavity having an inside body diameter that is larger than an outer diameter of a selected tube that is to be connected to by the fitting. The cartridge is disposed in the cylindrical cavity of the connector body and has a passageway therethrough. The cartridge is selected from a plurality of different sized cartridge and the selected cartridge has an inside diameter that generally corresponds to the outer diameter of the selected tube. When the fastener is attached at the connector body, the fastener urges the retaining ring into engagement with the selected tube and at least one of the end of the connector body and the selected cartridge to secure the selected tube within the selected cartridge and the connector body.

25 Claims, 9 Drawing Sheets

(51) Int. Cl.
  *F16L 25/00* (2006.01)
  *F16L 33/30* (2006.01)
  *F16L 37/02* (2006.01)
  *F16L 19/028* (2006.01)
  *F16L 25/14* (2006.01)
  *F02M 37/00* (2006.01)

(52) U.S. Cl.
  CPC ......... *F16L 19/0286* (2013.01); *F16L 25/009* (2013.01); *F16L 25/14* (2013.01); *F16L 33/30* (2013.01); *F16L 37/02* (2013.01)

(58) Field of Classification Search
  USPC .................................................. 285/353, 354
  See application file for complete search history.

(56) References Cited

U.S. PATENT DOCUMENTS

| | | | |
|---|---|---|---|
| 3,273,866 A * | 9/1966 | Lancy | B01F 3/0412 285/354 |
| 3,376,053 A | 4/1968 | Novakovich et al. | |
| 3,679,237 A * | 7/1972 | De Angelis | F16L 19/025 285/353 |
| 3,931,992 A | 1/1976 | Coel | |
| 3,953,058 A | 4/1976 | Soblesky | |
| 4,432,569 A | 2/1984 | Wietecha | |
| 4,458,927 A * | 7/1984 | Smith | F16L 19/08 285/353 |
| 4,607,868 A | 8/1986 | Harvey et al. | |
| 4,801,160 A | 1/1989 | Barrington | |
| 4,893,848 A | 1/1990 | Melcher | |
| 5,616,203 A | 4/1997 | Stevens | |
| 5,752,726 A | 5/1998 | Fixemer | |
| 6,354,637 B1 * | 3/2002 | Coronado | F16L 19/0218 285/357 |
| 6,416,087 B1 * | 7/2002 | Kremer | F16L 19/02 285/351 |
| 6,547,255 B1 * | 4/2003 | Donaway | F16L 23/18 210/445 |
| 6,709,023 B2 | 3/2004 | French | |
| 6,745,413 B2 | 6/2004 | Pinciaro | |
| 6,899,358 B2 * | 5/2005 | Richardson | F16L 19/0212 285/354 |
| 7,549,680 B2 * | 6/2009 | Gibbs | E03C 1/021 285/354 |
| 9,435,470 B2 * | 9/2016 | Okabe | F16L 19/0286 |
| 2005/0012328 A1 | 1/2005 | Baying et al. | |
| 2005/0099008 A1 | 5/2005 | Glover | |
| 2006/0273582 A1 | 12/2006 | Anselmo et al. | |
| 2011/0175348 A1 | 7/2011 | Bogert et al. | |
| 2011/0204624 A1 | 8/2011 | Lawrence | |
| 2012/0032439 A1 | 2/2012 | Williams et al. | |
| 2012/0038150 A1 | 2/2012 | Williams et al. | |
| 2013/0167841 A1 | 7/2013 | Sheffer et al. | |

OTHER PUBLICATIONS

International Search Report and Written Opinion dated Oct. 16, 2015 from corresponding PCT Application No. PCT/US2015/041695.

* cited by examiner

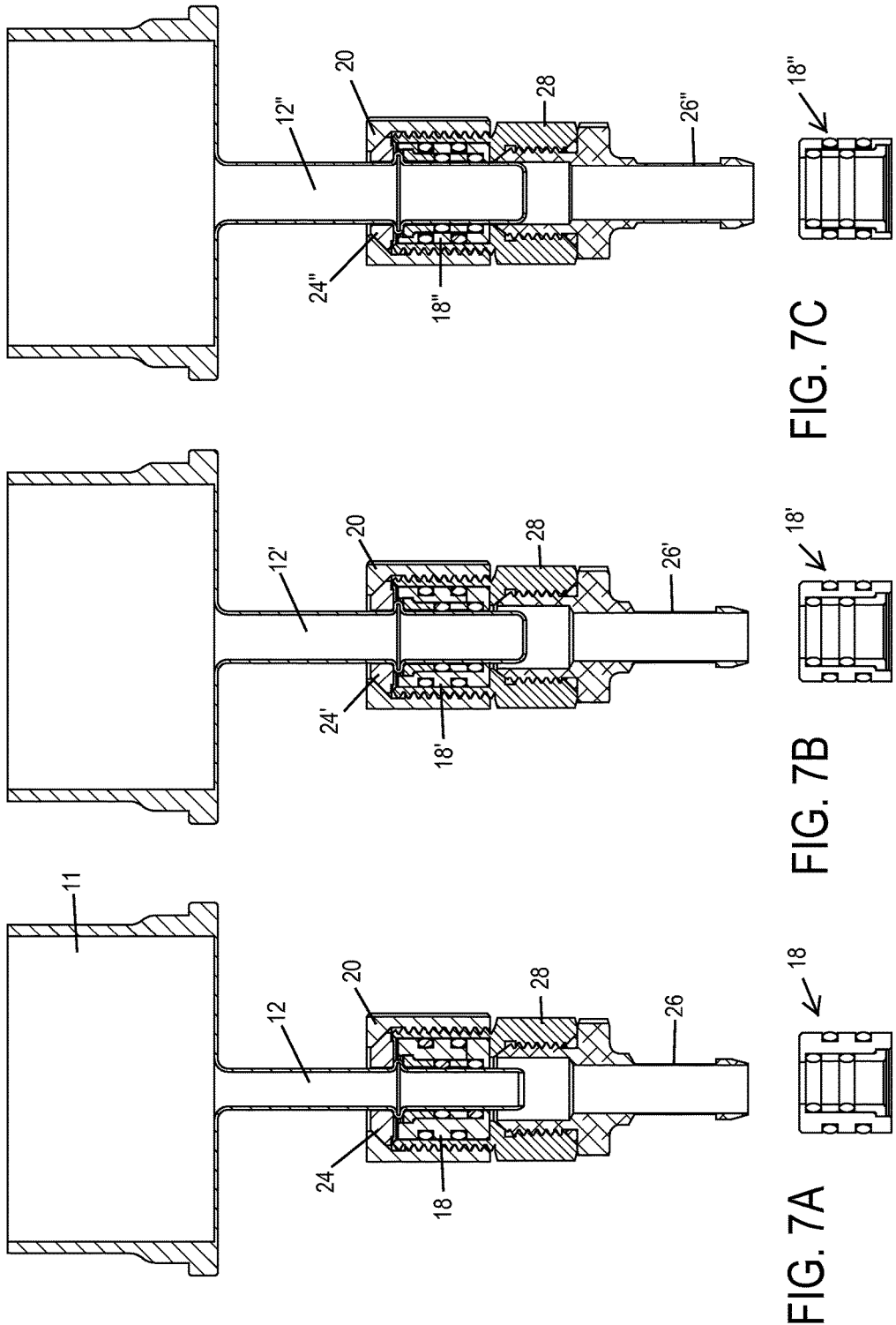

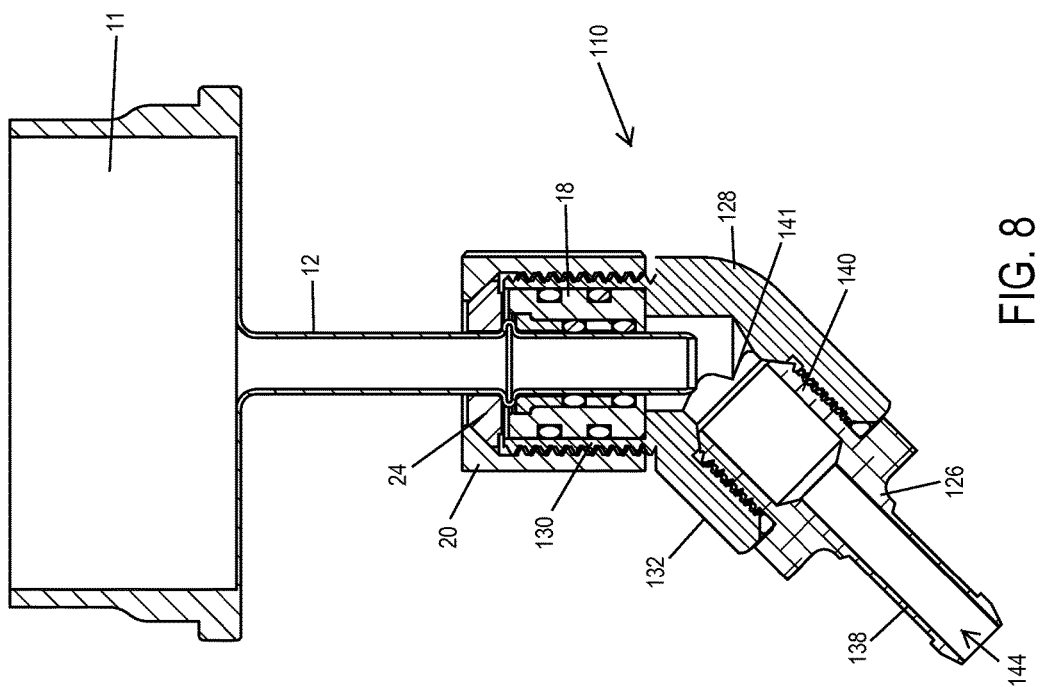

UNIVERSAL TUBE FITTING ADAPTABLE FOR DIFFERENT SIZED TUBES

CROSS REFERENCE TO RELATED APPLICATIONS

The present application claims the filing benefits of U.S. provisional application Ser. No. 62/028,498, filed Jul. 24, 2014, which is hereby incorporated herein by reference in its entirety.

FIELD OF THE INVENTION

The present invention relates generally to fittings for connecting to tubing and, more particularly, to fittings for beadlock type tubes.

BACKGROUND OF THE INVENTION

Quick connect fittings are commonly used in fluid transporting applications to transition between rigid tubing and flexible tubing, such as between steel and nylon tubing, or between tubing of different sizes. The fittings or couplers can be found in various applications, such as automotive fuel systems, power steering systems, cooling systems, and the like. The fittings generally secure to the rigid tubing and include a barbed tip for inserting into the flexible tubing (such as nylon tubing or the like) in order to create a generally leak proof connection between the two tubes. The fittings come in different sizes and are chosen based on the diameter or diameters of the tubes to be joined. Thus, multiple fittings (including different sized bodies, and fasteners and the like) are required to accommodate different sized tubes.

SUMMARY OF THE INVENTION

The present invention provides a tube fitting or union that is adaptable to fit tubing of different diameters. The fitting comprises a common or universal main body, a cartridge, and a common or universal fastener. The main body has a first end and a second end with a fluid passageway extending between the two ends. The first end of the main body includes a cylindrical cavity of a predetermined or selected diameter. The predetermined or selected diameter is chosen or selected to be larger than the outer diameter of the largest diameter tube for which the fitting is to be used. The cartridge is configured to be received in the cylindrical cavity of the main body and has an outer diameter that generally corresponds to the predetermined diameter of the cylindrical cavity and a selected inner diameter that generally corresponds to the outer diameter of the tube that is to be connected or coupled with the tube fitting. The fastener secures the main body with the installed cartridge relative to the tube, such as to a raised ridge or bead of the tube (such as via threadedly engaging the main body or via other attachment means, such as a press fit or quick connect or snap attachment or the like).

Different cartridges having the same outer diameter, but having different inner diameters sized for the different sized tubes, allows for a universal main body and fastener that can be used on tubes of different sizes. The cartridge may include one or more sealing elements, which form a leak proof seal between the main body and the tube.

The second end of the main body may provide any coupling configuration for coupling the tube to another tube or coupler or element. For example, the second end of the main body may include a coupler for attaching to a flexible tubing, such as nylon tubing, to couple the tube fitting and tube to the flexible tubing. The coupler may be detachable and may be selected to match the diameter of the flexible tubing being attached. The components of the fitting are configured to readily connect using standard hand tools, allowing for easy installation.

These and other objects, advantages, purposes and features of the present invention will become more apparent upon review of the following specification in conjunction with the drawings.

BRIEF DESCRIPTION OF THE DRAWINGS

FIG. 7A is a sectional view of an adaptable tube fitting in accordance with the present invention, shown connecting to a smaller diameter tube with a smaller sized inside diameter cartridge;

FIG. 7B is a sectional view of an adaptable tube fitting in accordance with the present invention, shown connecting to a medium diameter tube with a medium sized inside diameter cartridge;

FIG. 7C is a sectional view of an adaptable tube fitting in accordance with the present invention, shown connecting to a larger diameter tube with a larger sized inside diameter cartridge;

FIG. 8 is a sectional view of a 45-degree adaptable tube fitting in accordance with the present invention.

DESCRIPTION OF THE PREFERRED EMBODIMENTS

Figure 1:
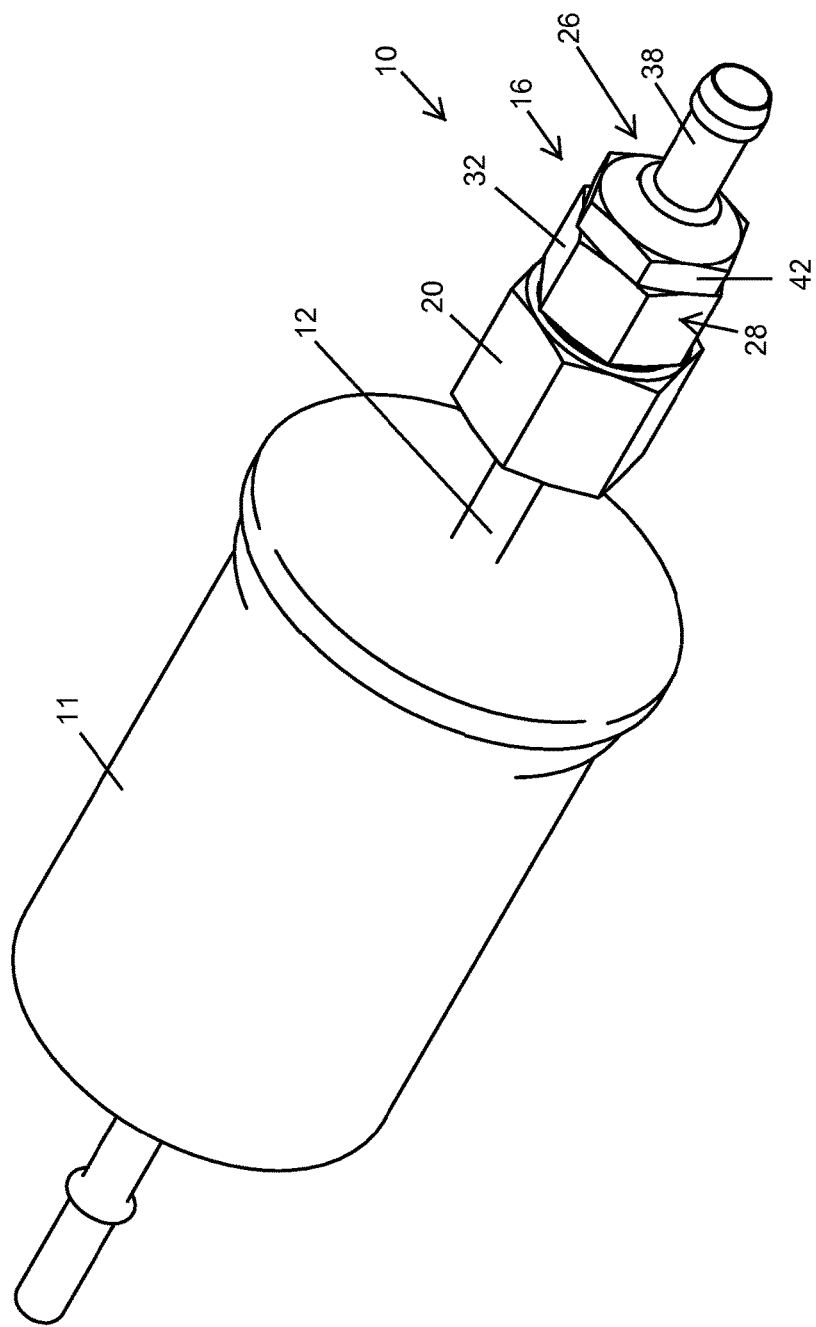
FIG. 1 is a perspective view of an adaptable tube fitting in accordance with the present invention, shown attached to a fuel filter.
Figure 2:
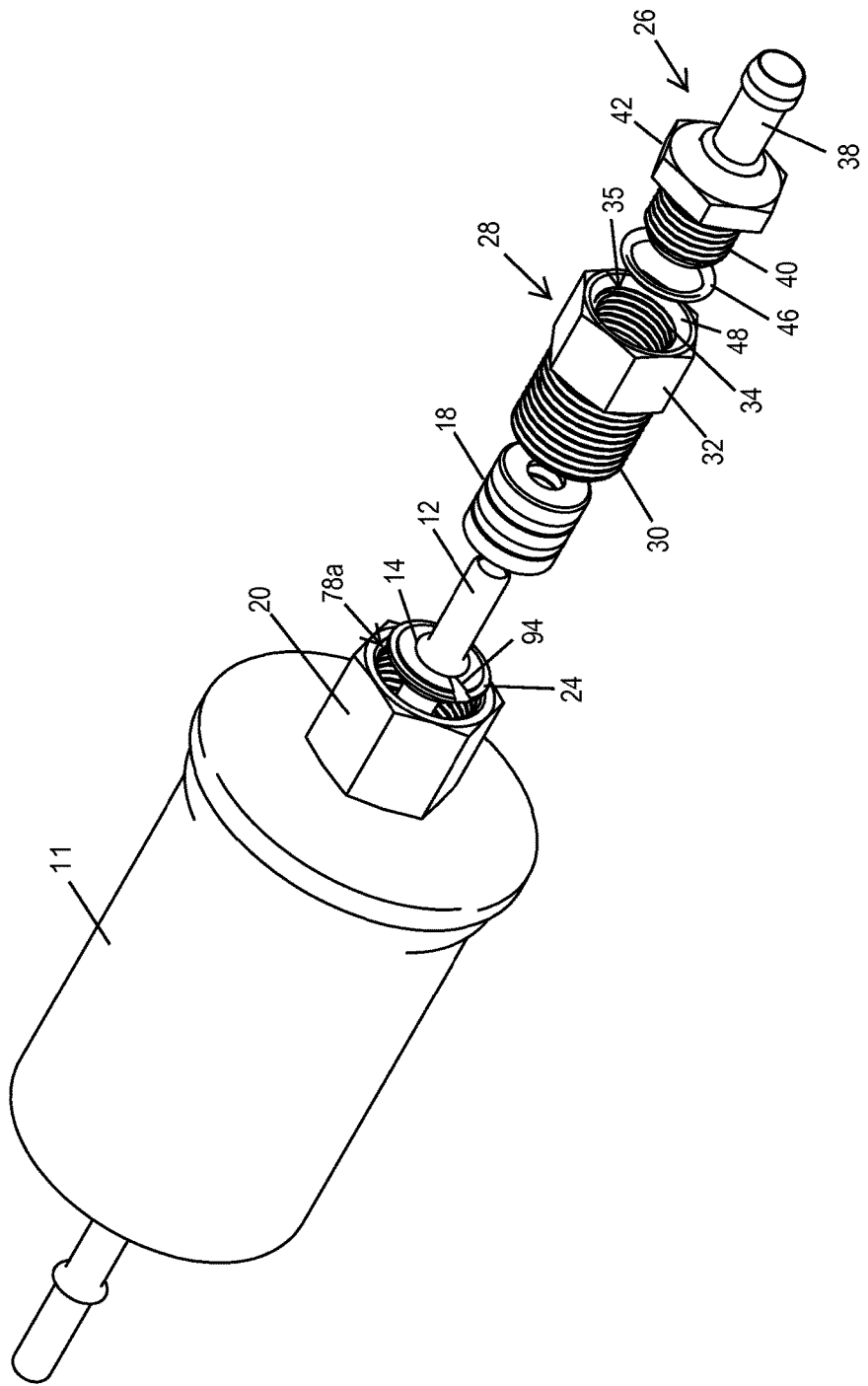
FIG. 2 is an exploded view of the adaptable tube fitting of FIG. 1.
Figure 3:
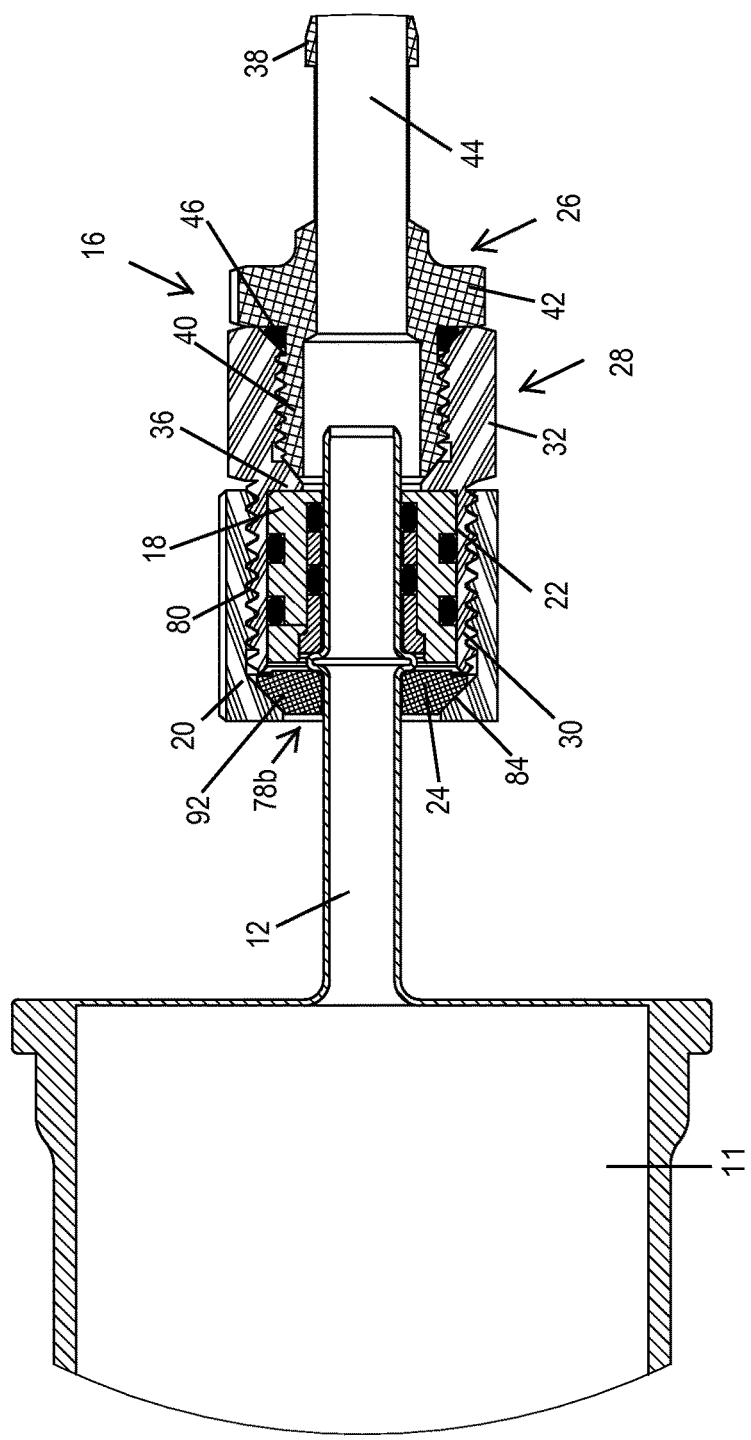
FIG. 3 is a sectional view of the adaptable tube fitting of FIG. 1.
Figure 6:
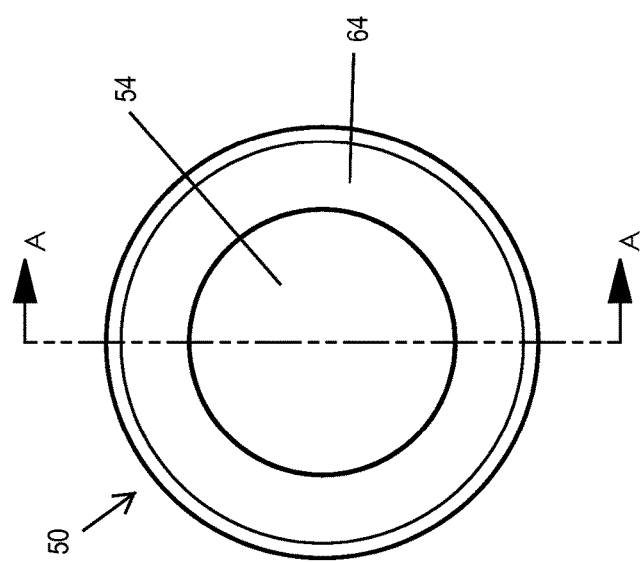
FIG. 6 is an end view of the cartridge of FIG. 4.
Figure 4:
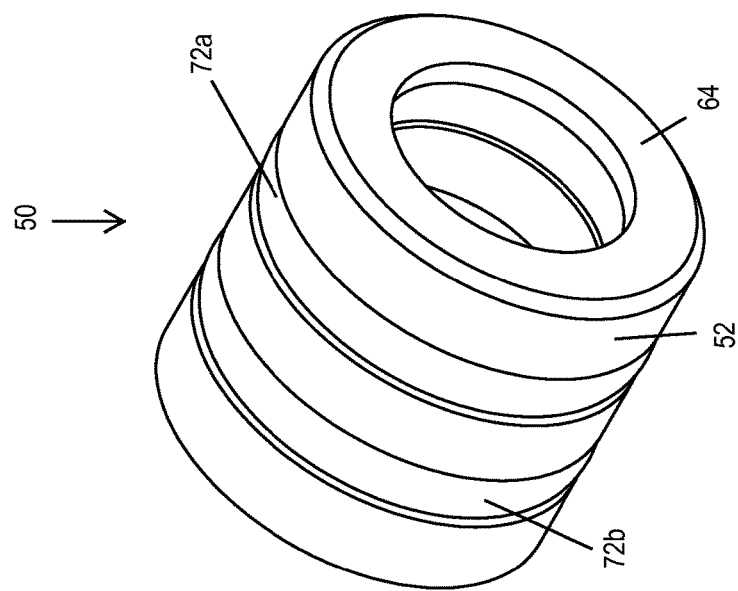
FIG. 4 is a perspective view of a cartridge of the tube fitting of FIG. 1.
Figure 5:
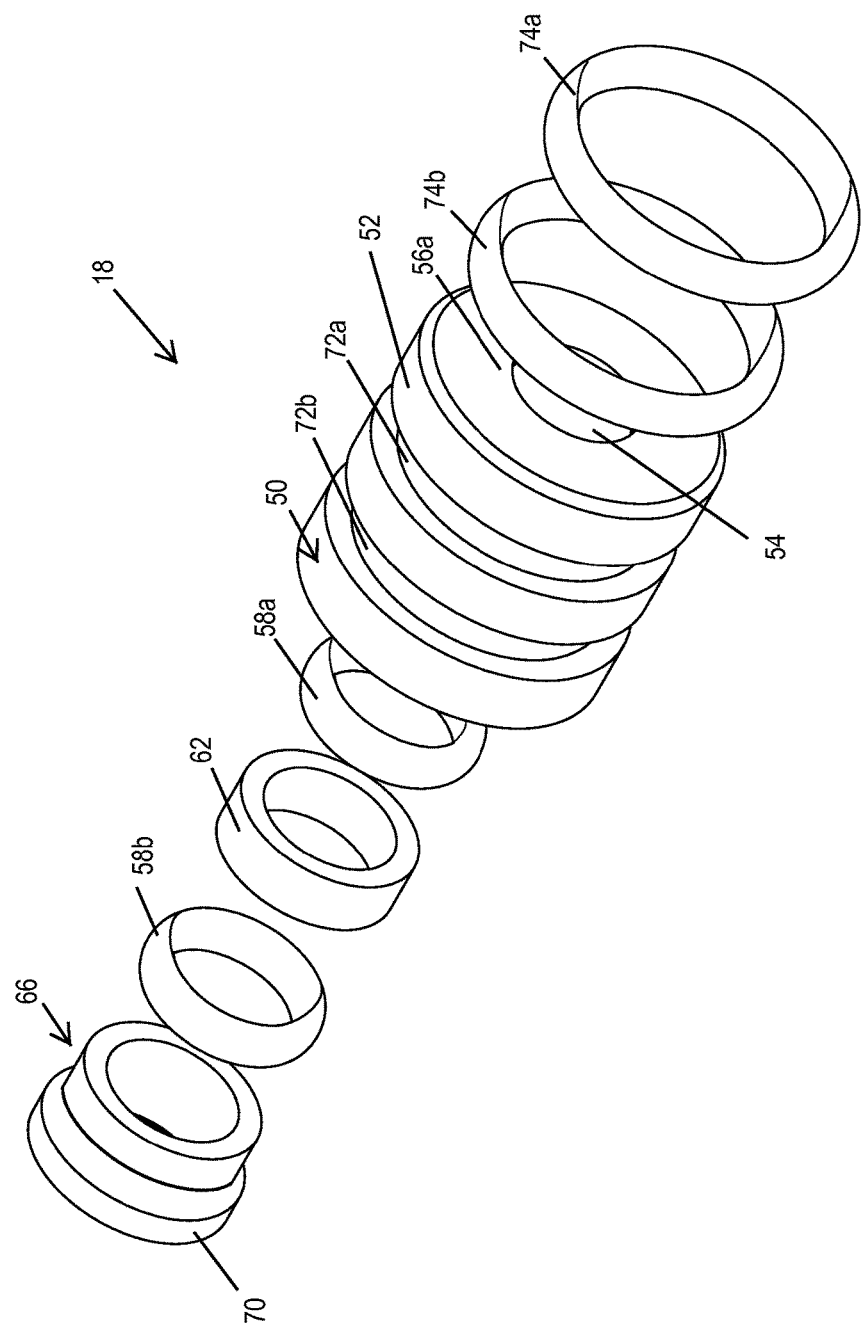
FIG. 5 is an exploded view of the cartridge of FIG. 4.
Figure 6A:
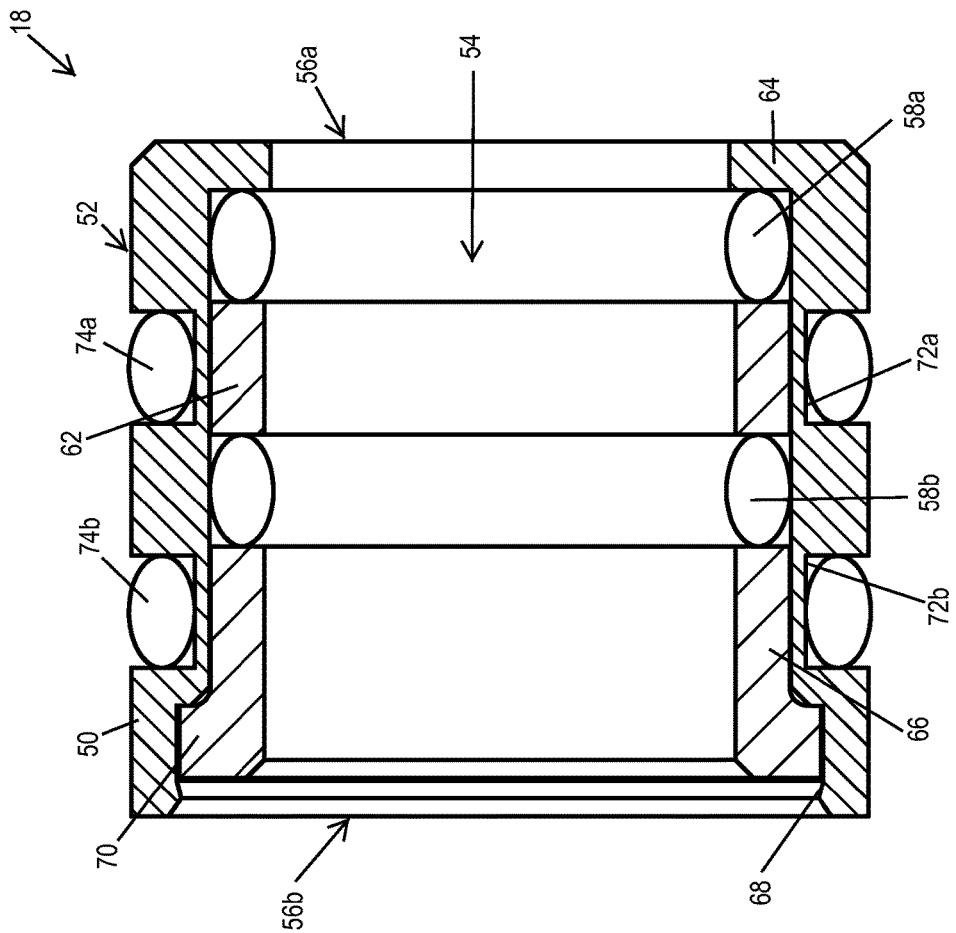
FIG. 6A is a sectional view of the cartridge, taken along the line A-A in FIG. 6.

Referring now to the drawings and the illustrative embodiments depicted therein, where identical components are denoted by the same reference numerals throughout the views, an adaptable or configurable or reconfigurable quick connect fitting 10 for a hose or tube 12 (such as a beadlock tube having a bead 14 or similar attachment element established or formed at or near an end region or connecting region of the tube) includes a main body 16, a tubular shaped sealing cartridge or insert 18, and a tightening nut or fastener 20 (FIGS. 1-3). Beadlock type connections are common on automotive components such as fuel filters (such as fuel filter 11 as shown in FIGS. 1 and 2), fuel injection lines, fuel pump connection, vapor return connections and the like. As discussed in detail below, main body 16 of fitting 10 has a cylindrical cavity for receiving a selected cartridge 18 therein.

Cartridge 18 may be chosen from a variety of cartridges having a universal outer diameter that generally corresponds to the diameter of the cylindrical cavity of main body 16 and an inner diameter that generally corresponds to the outer diameter of the selected tube to which fitting 10 is to attach, as discussed below. The different sized cartridges of the present invention allows for a single universal main body 16 and fastener 20 to be used on a variety of tube sizes. Cartridge 18 includes one or more sealing elements, which provide a leak proof seal between main body 16 and tube 12. In the illustrated embodiment, the fitting 10 secures to tube 12 by sandwiching the bead 14 of the tube between the main body 16 and fastener 20 (such as between a portion of the cartridge and a retaining ring, as discussed below). The fitting includes a tapered washer or retaining ring 24 having a split ring configuration and an inner diameter generally corresponding to the outer diameter of the selected size tube 12 is disposed between fastener 20 and bead 14, allowing for a single universal fastener 20 regardless of the size of tube 12, as also discussed below.

As best shown in FIGS. 2 and 3, fitting 10 includes a detachable coupler 26 and a connector body 28, which combine to form the main body 16 and which are configured to connect tube 12 to another tube or connector or the like (not shown) via a fitting end 38 of coupler 26, as discussed further below. In the illustrated embodiment, connector body 28 includes a hollow threaded shaft portion 30 with hex nut or fastener portion 32 at an end thereof. The shaft 30 portion has a cylindrical passageway or cavity 22, which is generally concentric with a threaded passageway 34 through the hex nut portion 32 of connector body 28. Together, cylindrical cavity 22 and threaded passageway 34 define a passageway 35 extending through connector body 28. In the illustrated embodiment, cylindrical cavity 22 has a diameter that is larger than the diameter of threaded passageway 34, creating a stop or ledge 36 that limits the extent to which cartridge 18 may insert into cylindrical cavity 22, as discussed below.

Threaded passageway 34 of connector body 28 is configured to receive the detachable coupler 26. Coupler 26 may comprise any desired or suitable or selected coupler for coupling or connecting to another tube (such as a flexible tube or rigid tube) or other connector or element. In the illustrated embodiment, the coupler 26 includes a hollow barbed tip 38 at one end, a hollow threaded shaft 40 at the other end, and a hex shaped flange 42 disposed between tip 38 and shaft 40. The hollow threaded shaft 40 is threadedly connectable or attachable to the threaded passageway 34 of connector body 28 to attach the coupler 26 to the connector body 28 (and can be tightened via use of wrenches or the like at the fastener portions 32 and 42). Barbed tip 38 is configured to insert into the line or tubing or hose to be connected to tube 12 and may be any one of a number of sizes, such as, for example, ⅜ inch diameter, 5/16 inch diameter, or ¼ inch diameter or the like, based on the diameter of the line or tube being connected. The coupler may be provided in different sizes, with each size having a different coupler end or barbed tip. Regardless of the size or shape of the coupler end or barbed tip, the outer diameter of threaded shaft 40 remains the same for each coupler and is dimensioned to thread into threaded passageway 34 of connector body nut 32. Thus, a universal connector body 28 may be used, regardless of the size of the tube that it is to connect to, and a selected or desired or appropriate connector end of the coupler may be provided by selecting a coupler having the desired or appropriate size and/or shape of the connector end or barbed tip.

The hollow barbed tip 38 and the hollow threaded shaft 40 define a fluid passageway 44 that extends longitudinally through coupler 26. As can be seen with reference to FIG. 3, tube 12 is received through cartridge 18 and protrudes into passageway 44 at threaded shaft portion 40, such that fluid from tube 12 flows through passageway 44 and out barbed tip 38 and into the connected tube (not shown) that is attached at the barbed tip 38.

As shown in FIG. 3, a sealing element 46 (such as a fuel resistant sealing element, such as an O-ring or the like) is disposed between threaded shaft 40 and flange 42 of coupler 26. The periphery of threaded passageway 34 of fastener portion 32 includes a tapered or chamfered rim or landing 48 for receiving sealing element 46. As shaft portion 40 threads into threaded passageway 34, sealing element 46 compresses between flange 42 and rim 48 to form a substantially leak proof seal between connector body 28 and coupler 26. The hexagonal-shaped outer surfaces of flange 42 and nut 32 allow for easy tightening of coupler 26 to connector body 28 using standard hand tools. Optionally, the coupler and connector body may be part of a single-piece main body rather than being two separate and detachable pieces.

In order for the connector body 28 (or main body 16 if connector body is assembled to coupler 26) to accommodate different diameter tubes or hoses (such as beadlock tubes), tubular cartridges 18 are selected for particular sized tubes. The cartridges 18 have a common outer diameter with an inner diameter selected to generally match or correspond with the outer diameter of the tube to which the connector body 28 is to attach. As best shown in FIGS. 2 and 3, cartridge 18 receives tube 12 therein and therethrough and presents a constant diameter to which the universal connector body 28 or main body 16 may connect. The cartridge is selected from a plurality of cartridges having different inside diameters so that an appropriate cartridge may be selected to correspond to the outer diameter of the applicable tube 12.

As shown in FIGS. 4-6A, cartridge 18 includes a hollow outer sleeve or body 50 having an outer surface 52 and an internal passageway 54 extending between openings 56a and 56b at opposite ends of the cartridge body. In the illustrated embodiment, the outer surface 52 of cartridge 18 includes a pair of recessed grooves 72a and 72b configured to receive respective sealing elements 74a, 74b (such as fuel resistant sealing elements or the like), such as O-rings or the like. The width of grooves 72a, 72b is generally equal to the cross-sectional diameter of sealing elements 74a, 74b so that sealing elements 74a, 74b seat securely in the respective grooves 72a, 72b. The depth of grooves 72a, 72b is less than the cross-sectional diameter of sealing elements 74a, 74b so that, when sealing elements 74a, 74b are installed in grooves 72a, 72b, some portion of sealing elements 74a, 74b protrudes outside of grooves 72a, 72b and protrudes radially outboard from outer surface 52. The outer diameter of cartridge 18 is dimensioned to be slightly smaller than the diameter of cylindrical cavity 22 of connector body 28 so that, when cartridge 18 is received in or disposed in cavity 22, the sealing elements 74a, 74b compress to form a leak proof seal between connector body 28 and cartridge 18. Dual sealing elements 74a, 74b provide redundancy to ensure a proper seal. Optionally, a single sealing element may be used.

Cartridge 18 also includes a pair of sealing elements 58a and 58b (such as fuel resistant sealing elements), such as O-rings or the like, disposed inside the passageway 54 of cartridge 18. Sealing elements 58a, 58b are used to seal between and at the interface of cartridge 18 and tube 12. In the illustrated embodiment, a hollow annular spacer 62 is disposed between sealing elements 58a, 58b and has an inner diameter slightly larger than the outer diameter of tube 12, such that the spacer 62 may compress against the tube when the tube is received in and through cartridge 18. Spacer 62 ensures the proper spacing and positioning of sealing elements 58a, 58b and may be glued, snapped or otherwise secured into passageway 54 (or may be formed as part of the cartridge). Likewise, a second annular spacer 66, having an inner diameter generally equal to the inner diameter of spacer 62, may be disposed at passageway 54 (such as glued, snapped or otherwise secured at and into the passageway or integrally formed as part of the cartridge) between sealing element 58b and opening 56b, in order to hold sealing elements 58a, 58b and spacer 62 in the passageway 54 of cartridge 18. Cartridge 18 includes a lip or tab 64 at the opposite end opening 56a to limit insertion of the sealing element 58a (and spacer 62 and sealing element 58b) into cartridge 18, with the lip 64 extending radially inward at opening 56a a radial length or dimension that is generally equal to the thickness of spacer 62 such that the diameter of opening 56a generally corresponds to the outer diameter of tube 12. Also, a recessed region 68 may be established at cartridge 18 about the periphery of the opposite opening 56b and may be dimensioned to receive a radial flange 70 of spacer 66, which is dimensioned to protrude into region 68 and may be comprised of a compressible material to provide additional sealing capabilities around the bead 14 of tube 12 when the main body 16 and internal cartridge 18 are secured to tube 12, as discussed below.

Spacer 62 and spacer 66 thus allow the sealing surface of the cartridge at the tube to be distributed between sealing elements 58a, 58b. The cross-sectional diameters of sealing elements 58a, 58b are generally greater than the thickness of spacers 62, 66 and flange 64 so that when tube 12 is installed into passageway 54 of cartridge 18, sealing elements 58a, 58b compress slightly in order to form a leak proof seal between tube 12 and cartridge 18. Optionally, a single sealing element, such as a wide square edge sealing element for example, may be used in place of sealing elements 58a, 58b and spacers 62, 66.

As best shown in FIGS. 2 and 3, connector body 28 (with internal cartridge 18 disposed therein) secures to beadlock tube 12 using fastener 20. Fastener 20 comprises a hex nut having open ends 78a, 78b, with a threaded passageway 80 extending between the two ends. Passageway 80 is dimension to receive and threadedly engage shaft portion 30 of connector body 28. The open end 78b of fastener 20 is dimensioned to fit over the bead of the largest supported tube size for fitting 10 so that a single fastener 20 can be used for all applications, with the opening having a smaller diameter than threaded passageway 80. The inner wall of the fastener 20 includes the threaded passageway portion 80 and a tapered region 84 that extends between the larger diameter threaded passageway 80 and the smaller diameter opening 78b. Tapered region 84 is configured to engage retaining ring 24, which is disposed between fastener 20 and bead 14 to hold tube 12 (via engagement with the bead 14) in the connector or fitting 10 when fastener 20 is tightened onto connector body 28.

In the illustrated embodiment, retaining ring 24 comprises a split ring or washer or element having a tapered peripheral edge 92 with a split or break 94 extending through the ring. Similar to the cartridges discussed above, the retaining rings have a common outer diameter and outer tapered edge, but are formed with different sized inner diameters to fit the particular beadlock tube being used. As can be seen with reference to FIG. 3, retaining ring 24 is selected to have an inner diameter substantially equal to the outer diameter of tube 12.

In order to position the retaining ring 24 on the tube and upstream of the beadlock or ridge 14, the retaining ring preferably comprises a split ring having a break or gap to allow for expansion of the ring to slide the ring (when expanded) over the beadlock and along the tube (after the fastener has already been slid over the beadlock and onto the tube). The tapered peripheral edge 92 is configured to engage the inner tapered region 84 of fastener 20 so that when fastener 20 is tightened onto the threaded shaft portion 30 of connector body 28, retaining ring 24 is compressed between fastener 20 and connector body 28 to capture the bead 14 of tube 12 between the retaining ring 24 and the spacer 66. Optionally, retaining ring 24 may comprise a compressible or elastomeric or resilient material to conform against the tube and bead and fastener and cartridge so as to provide a leak proof seal between fastener 20 and connector body 28 and tube 12.

Inboard of the bead 14, the cartridge 18 is held in place in the connector body between the retaining ring 24 and the ledge or flange 36 of the connector body, and thus is held firmly against bead 14 and retaining ring by ledge 36 in cavity 22. As fastener 20 is tightened onto shaft 30 of connector body 28, the retaining ring 24 presses against bead 14, which in turn presses against flange 70 of spacer 66 to secure the fitting 10 at the beadlock tube 12. Thus, the tube is tightly connected and sealed at the fitting 10 via a common fastener and connector body, with the retaining ring and cartridge being selected for the particular sized tube that is used.

Thus, during use of the fitting of the present invention, a user may slide the fastener 20 along the end region of a tube and past the raised annular ridge or bead of the beadlock tube, and may then slide a selected or appropriate retaining ring 24 onto the tube and over or past the tube bead (such as by expanding or stretching or flexing the retaining ring as it moves past the tube bead). A selected cartridge 18 (having an inside diameter appropriate for the outside diameter of the beadlock tube) is inserted into the body portion and then the end region of the tube may be inserted into the passageway of the cartridge until the tube bead engages the flange of the spacer 66 of the cartridge. The fastener and retaining ring may then be slide along the tube until the retaining ring engages the tube bead and the fastener threadedly engages the threads of the body. Tightening of the fastener then urges the retaining ring into engagement with the tube bead and urges the tube bead into engagement with the spacer, thereby securing the tube in the cartridge and body, with the seals of the cartridge sealing against the body and the tube to provide a sealed union or connection of the tube and connector or fitting. Although shown and described as coupling to a beadlock type tube, the universal fitting of the present invention may be adapted or configured for coupling to other types of tubes, such as, for example, a straight (non-ridged) tube with a separate compression element slid over the tube that is engaged by the retaining element and pressed between the spacer and the retaining element to compress onto the tube and urge the tube into the cartridge when the fastener is tightened.

Thus, and such as shown in FIGS. 7A-C, connector body 28 and fastener 20 may be adapted to fit tubes of different sizes, such as, for example, a ¼ inch tube 12 (FIG. 7A), a 5/16 inch tube 12' (FIG. 7B), or a ⅜ inch tube 12" (FIG. 7C), by selecting an appropriate sized cartridge 18, 18', or 18" and an appropriate sized retaining ring 24, 24', or 24", each having an inner diameter that generally coincides with the outer diameter of the selected tube 12, 12', or 12", respectively. As can be seen with reference to FIGS. 7A-C, the wall thickness of the cartridge varies, such that the cartridge 18 has a greater wall thickness than cartridge 18', which has a greater wall thickness than cartridge 18", and the inner sealing elements and spacers would accordingly have different dimensions to fit the inner cavity of the associated cartridge. Optionally, the detachable coupler may be chosen from different sized couplers, such as a ¼ inch coupler 26 (FIG. 7A), a 5/16 inch coupler 26' (FIG. 7B), or a ⅜ inch coupler 26" (FIG. 7C), based on the tube or hose that is to be connected at the other end of the fitting 10. For any given size of tube connected at the connector body, any coupler may be selected, depending on the size of the tube that the first tube or beadlock tube is being connected to via the fitting 10. The couplers may be readily selected and changed via threaded attachment and detachment at the connector body.

Although shown and described as a straight tube extending from a fuel filter, clearly, the fitting of the present invention may be used to connect to other types of tubes or hoses, depending on the particular application of the fitting. Optionally, the adaptable quick connect fitting of the present invention may be formed to provide an angled connection or coupling between two tubes, such as by having a main body that is angled. For example, and such as shown in FIG. 8, a fitting 110 (similar in most respects to fitting 10 described above, such that a detailed description need not be repeated herein) includes a connector body 128 having threaded shaft portion 130 and a hex nut or fastener portion 132 at an angle relative to the threaded shaft portion. In the illustrated embodiment of FIG. 8, the shaft 130 and fastener portion 132 are disposed at about a 45-degree angle relative to each other. The fastener portion 132 is configured to receive a detachable coupler 126 having a hollow threaded shaft 140 and a hollow barbed tip 138, such as in a similar manner as described above (with the coupler being selected for the particular application and size of the tube or hose that is to be connected at the barbed tip of the coupler). When assembled, connector body 128 and coupler 126 define a fluid passageway 144 through fitting 110. Threaded shaft 140 may include a passageway portion or notch 141 established at the bend of the passageway to allow fluid to flow more easily through passageway 144. In such an embodiment, the threads may be configured so that when coupler 126 is fully threaded or tightened onto connector body 128, the notch 141 is generally aligned with tube 12 to provide clearance for the tube at the inner part of the bend in the passageway. Threaded shaft 130 has the same internal and external diameter as shaft 30 of fitting 10 so that fitting 110 may incorporate the same cartridge 18, retaining ring 24 and fastener 20 as described above, with the cartridge and retaining ring being selected depending on the size of the tube 12 that is being connected at the fitting 110, such as also described above.

Figure 9:
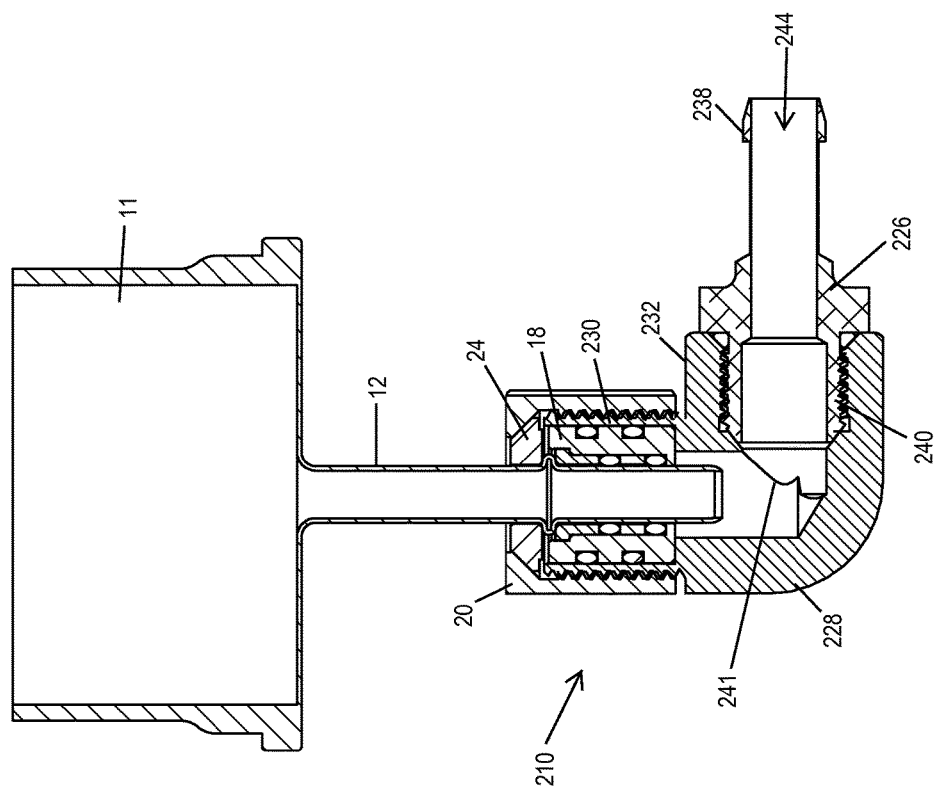
FIG. 9 is a sectional view of a 90-degree adaptable tube fitting in accordance with the present invention.

Optionally, other fitting configurations may be implemented, such as a 90 degree bent fitting. For example, and with reference to FIG. 9, a fitting 210 (similar in most respects to connector fittings 10 and 110 described above, such that a detailed description need not be repeated herein) includes a connector body 228 having threaded shaft portion 230 and a hex nut or fastener portion 232. Shaft 230 and nut 232 are disposed at about a 90-degree angle relative to each other. The fastener portion 232 is configured to receive a detachable coupler 226 having a hollow threaded shaft 240 and a hollow barbed tip 238, such as in a similar manner as described above (with the coupler being selected for the particular application and size of the tube or hose that is to be connected at the barbed tip of the coupler). When assembled, connector body 228 and coupler 226 define a fluid passageway 244 through fitting 210. Threaded shaft 240 may include a passageway portion or notch 241 established at the bend of the passageway to allow fluid to flow more easily through passageway 244. Threaded shaft 230 has the same internal and external diameter as shaft 30 of fitting 10 so that fitting 210 may incorporate the same cartridge 18, retaining ring 24 and fastener 20 as described above, with the cartridge and retaining ring being selected depending on the size of the tube 12 that is being connected at the fitting 110, such as also described above.

In the embodiments described above, the fastener, connector body, and coupler thread together. However, it is envisioned that these components may be fastened together via any suitable means, such as via a snap fit or quick connect attachment or the like. Optionally, the connector body and coupler may be integrally formed as a single component, depending on the particular application of the fitting.

Optionally, the fitting may include any type of connection at the end opposite the connector body, and may include another threaded shaft portion that receives another cartridge therein, so that the fitting may be adapted to connect two tubes together via the fastener, retaining ring and cartridge construction described above. In such an embodiment, the cartridge and retaining ring at each end may be selected for the particular tube being inserted therein, whereby the fitting may connect or couple tubes having the same or similar outside diameters or may connector or couple different sized tubes having different sized outside diameters, depending on the particular application of the connector or coupler or fitting of the present invention. Optionally, the threads of the fastener and the coupler may be opposite direction threads (such as a standard right hand directional thread for one and a non-standard left hand directional thread for the other), whereby tightening the threaded attachments may provide a turnbuckle effect to pull the lines or tubes together.

Optionally, the adaptable fitting may further be configured to support expansion elements, such as elements that may add system ports or the like for fuel system cleaning and/or fuel pressure indicator gauges. Such elements may be established along the connector body, with the ports in fluid communication with the passageway extending through the connector body.

The present invention provides a union or connector or fitting for connecting to one or more tubes, such as rigid beadlock tubes for automotive applications, such as for fuel filters, fuel injection lines, fuel pump connections, vapor return connections. Optionally, the union or connector or fitting of the present invention may be scaled up for larger applications, such as coolant hoses, oil coolers, transmission coolers and/or low pressure side power steering return lines or the like or any other fluid or gaseous tubing connection applications.

Therefore, the present invention provides a universal quick connect fitting adaptable to fit tubing (such as beadlock tubing having a ridge or bead established thereat) of different diameters and/or to join tubing having different diameters. The universal fitting reduces or eliminates the expense of stocking multiple fittings by incorporating a fastener and connector body that remain the same for each application, regardless of the tube size. Lower cost cartridges and retaining rings are selected and used to readily adapt the universal fastener and connector body to the different sized tubing based on the particular application of the fitting or connector. The unions or fittings may be sold as a package or kit, with a common or universal body and fastener, and with a plurality of different sized cartridges and retaining rings, whereby a user may select an appropriate cartridge and retaining ring for the particular application of the union or fitting and tube that is being connected thereto. Optionally, an interchangeable coupler allows for different sized barbed tips while keeping the same fastener and connector body. All of the elements of the fitting are configured for easy assembly by hand using standard tools.

Changes and modifications to the specifically described embodiments may be carried out without departing from the principles of the present invention, which is intended to be limited only by the scope of the appended claims as interpreted according to the principles of patent law including the doctrine of equivalents.

The invention claimed is:

1. A fitting for connecting to a tube, said fitting comprising:
   a connector body having a first end and a second end with a generally cylindrical cavity, said cylindrical cavity having an inside body diameter that is larger than an outer diameter of a tube that is to be connected to by said fitting;
   a cartridge disposed in said cylindrical cavity of said connector body at said first end of said connector body, said cartridge having a passageway therethrough, wherein an outer diameter of said cartridge generally corresponds to said inside body diameter of said cylindrical cavity of said connector body, and wherein an inner diameter of said passageway of said cartridge generally corresponds to the outer diameter of the tube;
   a fastener configured to attach at said first end of said connector body, said fastener comprising a passageway to receive the tube therethrough;
   a retaining ring disposed at least partially within said passageway of said fastener, wherein said retaining ring comprises an inner diameter and an outer diameter, wherein said inner diameter of said retaining ring generally corresponds to the outer diameter of the tube;
   wherein, when said fastener is attached at said first end of said connector body, said fastener urges said retaining ring into engagement with the tube and at least one of said first end of said connector body and said cartridge to secure the tube within said cartridge and said connector body;
   wherein said second end of said connector body is configured for attachment to another tube or fluid conduit; and
   wherein the tube comprises a raised annular ridge established near an end region of the tube, and wherein, when said fastener is attached at said first end of said connector body, said retaining ring engages the raised annular ridge and urges the raised annular ridge into engagement with said cartridge.

2. The fitting of claim 1, comprising a sealing element disposed about an outer surface of said cartridge, wherein said sealing element substantially seals against an inner surface of said connector body when said cartridge is disposed in said cylindrical cavity.

3. The fitting of claim 1, comprising a tube sealing element disposed within said passageway of said cartridge, wherein said tube sealing element substantially seals against an outer surface of the tube when the tube is received in said cartridge.

4. The fitting of claim 1, wherein a coupler is disposed at said second end of said connector body and wherein said coupler is configured for coupling said fitting to another tube or fluid conduit.

5. The fitting of claim 4, wherein said coupler is threadedly attached at said second end of said connector body.

6. The fitting of claim 4, further comprising a sealing element disposed between said coupler and said connector body.

7. The fitting of claim 4, wherein said connector body is angled such that a longitudinal axis of said coupler is angled relative to a longitudinal axis of said cylindrical cavity of said connector body.

8. The fitting of claim 7, wherein the angle of said connector body is about 45 degrees.

9. The fitting of claim 7, wherein the angle of said connector body is about 90 degrees.

10. The fitting of claim 1, wherein said fastener threadedly engages said first end of said connector body, and wherein, when said fastener is tightened at said first end of said connector body, said retaining ring urges the raised annular ridge of the tube into sealing engagement with said cartridge to secure and seal the tube in said cartridge and said connector body.

11. The fitting of claim 10, wherein said retaining ring includes a tapered outer surface, and wherein said fastener includes a corresponding tapered inner surface so that, when said fastener is attached at said first end of said connector body, said tapered inner surface of said fastener engages said tapered outer surface of said retaining ring to urge said retaining ring towards the raised annular ridge of the tube and to urge the tube into engagement with said cartridge to substantially seal said connector body relative to the tube and said cartridge.

12. The fitting of claim 10, wherein said retaining ring comprises a split ring, wherein a gap in said ring allows said retaining ring to expand to fit over the raised annular ridge of the tube during assembly of said fitting at the tube.

13. A method of connecting two fluid conduits or tubes together, said method comprising:
   providing a fitting comprising a connector body and a fastener, wherein said connector body comprises a first end and a second end with a cylindrical cavity therein, wherein said fastener is configured to attach at said first end of said connector body;
   providing a retaining ring configured to be disposed at least partially within said passageway of said fastener;
   providing a plurality of cartridges, each of said cartridges having a respective inner diameter and a common outer diameter, wherein said common outer diameter of said cartridges generally corresponds to an inner diameter of said cylindrical cavity of said connector body;
   providing a first tube;
   selecting a particular one of said cartridges, wherein said inner diameter of said selected cartridge generally corresponds to an outer diameter of the provided first tube;
   inserting said selected cartridge into said cylindrical cavity of said connector body;
   receiving the first tube through said fastener and through said retaining ring;
   inserting an end region of the first tube into said selected cartridge and said connector body; and
   attaching said fastener at said first end of said connector body to engage said retaining ring with the first tube to urge the end region of the first tube into said selected cartridge and said connector body to substantially secure and seal the first tube relative to said selected cartridge and said body.

14. The method of claim 13, wherein providing a first tube comprises providing a first tube having a raised annular bead near the end region of the first tube, and wherein attaching said fastener at said first end of said connector body comprises attaching said fastener at said first end of said connector body to engage said retaining ring with the raised annular bed of the first tube to urge the raised annular bead of the first tube into engagement with said selected cartridge to substantially secure and seal the first tube relative to said selected cartridge and said connector body.

15. The method of claim 14, wherein attaching said fastener at said first end of said connector body comprises threadedly attaching said fastener at said first end of said connector body.

16. The method of claim 14, wherein providing a retaining ring comprises providing a plurality of retaining rings, each of said retaining rings having a respective inner diameter and a common outer diameter, wherein said method comprises selecting a particular one of said retaining rings and wherein said inner diameter of said selected retaining ring generally corresponds to the outer diameter of the first tube.

17. The method of claim 16, wherein selection of said selected retaining ring corresponds with selection of said selected cartridge.

18. The method of claim 13, wherein said second end of said connector body is configured to attach to a second tube or fluid conduit.

19. The method of claim 18, comprising attaching a coupler at said second end of said connector body, wherein said coupler is configured to attach to the second tube or fluid conduit.

20. A kit for connecting a fitting to various sized tubes, said kit comprising:
a connector body having a first end and a second end with a generally cylindrical cavity, said cylindrical cavity having an inside body diameter that is larger than an outer diameter of a largest diameter tube that is to be connected to by said fitting;
a fastener configured to attach at said first end of said connector body, said fastener comprising a passageway configured to receive the largest diameter tube therethrough;
a plurality of cartridges having a passageway therethrough, each of said cartridges having a respective inner diameter and a common outer diameter, wherein said common outer diameter of said cartridges generally corresponds to an inner diameter of said cylindrical cavity of said connector body;
at least one retaining ring configured to be disposed at least partially within said passageway of said fastener, wherein said retaining ring comprises an inner diameter and an outer diameter;
wherein, for a selected tube to which said fitting is to be connected, a selected cartridge is selected from said plurality of cartridges, and wherein said selected cartridge has its inner diameter generally corresponding to the outer diameter of the selected tube;
wherein, when the tube is received through said fastener and said retaining ring and into said selected cartridge in said connector body and when said fastener is attached at said first end of said connector body, said fastener urges said retaining ring into engagement with the selected tube and at least one of said second end of said connector body and said selected cartridge to secure the selected tube within said selected cartridge and said connector body; and
wherein said second end of said connector body is configured for attachment to another tube or fluid conduit.

21. The kit of claim 20, wherein said at least one retaining ring comprises a plurality of retaining rings, each of said retaining rings having a respective inner diameter and a common outer diameter, wherein, for the selected tube to which said fitting is to be connected, a selected retaining ring is selected from said plurality of retaining rings, and wherein said selected retaining ring has its inner diameter generally corresponding to the outer diameter of the selected tube.

22. The kit of claim 21, wherein the selected tube comprises a raised annular ridge established near an end region of the selected tube, and wherein, when said fastener is attached at said first end of said connector body, said selected retaining ring engages the raised annular ridge and urges the raised annular ridge into engagement with said selected cartridge.

23. The kit of claim 22, wherein said fastener threadedly engages said first end of said connector body, and wherein, when said fastener is tightened at said first end of said connector body, said selected retaining ring urges the raised annular ridge of the selected tube into sealing engagement with said cartridge to secure and seal the selected tube in said selected cartridge and said connector body.

24. The kit of claim 23, wherein each of said plurality of retaining rings comprises a tapered outer surface, and wherein said fastener includes a corresponding tapered inner surface so that, when said fastener is attached at said first end of said connector body, said tapered inner surface of said fastener engages said tapered outer surface of said selected retaining ring to urge said selected retaining ring towards the raised annular ridge of the tube and to urge the tube into engagement with said selected cartridge to substantially seal said connector body relative to the selected tube and said selected cartridge.

25. The kit of claim 24, wherein each of said plurality of retaining rings comprises a split ring, wherein a gap in said selected retaining ring allows said selected retaining ring to expand to fit over the raised annular ridge of the selected tube during assembly of said fitting at the selected tube.

\* \* \* \* \*